United States Patent
Lam et al.

(10) Patent No.: US 12,513,131 B2
(45) Date of Patent: Dec. 30, 2025

(54) SYSTEM AND METHOD USING IDENTITY NON-FUNGIBLE TOKEN FOR IDENTITY VERIFICATION IN METAVERSE AND ONLINE SERVICES

(71) Applicant: Hong Kong Applied Science and Technology Research Institute Company Limited, Hong Kong (HK)

(72) Inventors: Chan Fai Lam, Hong Kong (HK); Man Yuen Cheng, Hong Kong (HK); Tsz Yu Cheung, Hong Kong (HK); Wei Lun Alan Cheung, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 92 days.

(21) Appl. No.: 18/670,745

(22) Filed: May 22, 2024

(65) Prior Publication Data
US 2025/0365275 A1    Nov. 27, 2025

(51) Int. Cl.
*H04L 9/40* (2022.01)
*H04L 9/08* (2006.01)
*H04L 9/32* (2006.01)

(52) U.S. Cl.
CPC ........ *H04L 63/0807* (2013.01); *H04L 9/0825* (2013.01); *H04L 9/3271* (2013.01)

(58) Field of Classification Search
CPC . H04L 9/3271; H04L 9/0825; H04L 63/0807; H04L 9/3213; H04L 9/3239; H04L 9/3247; H04L 9/50
See application file for complete search history.

(56) References Cited

U.S. PATENT DOCUMENTS

9,032,509 B2 *  5/2015  Hamilton, II ............ G09C 5/00
                                                    726/17
9,635,000 B1 *  4/2017  Muftic ................. H04L 9/3239
(Continued)

FOREIGN PATENT DOCUMENTS

| CN | 113487321 A | 10/2021 |
| CN | 110324151 B | 12/2021 |

(Continued)

OTHER PUBLICATIONS

International Search Report and Written Opinion of corresponding PCT application No. PCT/CN2024/106095 mailed on Jan. 22, 2025.
(Continued)

*Primary Examiner* — Sharon S Lynch
(74) *Attorney, Agent, or Firm* — Idea Intellectual Limited; Sam T. Yip (57) ABSTRACT

A system for identity authentication on blockchain using NFTs includes a user interface, an identity NFT minting module, and a verifiable credential issuer module. The user interface allows a user to link a blockchain wallet and a credential wallet to the user interface and to provide an online service ID and requests the user to create signatures using a blockchain wallet private key and a credential wallet signing key. The identity NFT minting module verifies the online service ID and verifies the two signatures using the blockchain wallet address and the DID. The identity NFT minting module mints an identity NFT on a blockchain network, preserving the online service ID, the blockchain wallet address, and the DID in the identity NFT as metadata. The verifiable credential issuer module issues a verifiable credential to the user and triggers the identity NFT minting module for adding credential metadata to the identity NFT.

20 Claims, 9 Drawing Sheets

(56) References Cited

U.S. PATENT DOCUMENTS

| | | | | |
|---|---|---|---|---|
| 11,757,640 | B2* | 9/2023 | Ferenczi | H04L 9/3271 |
| | | | | 713/172 |
| 11,856,095 | B2* | 12/2023 | Stewart | H04L 9/3247 |
| 12,137,168 | B2* | 11/2024 | Khan | H04L 9/3236 |
| 12,160,515 | B2* | 12/2024 | Ferenczi | H04L 63/0823 |
| 12,175,454 | B1* | 12/2024 | Kurani | G06Q 20/3827 |
| 12,309,269 | B1* | 5/2025 | Kurani | H04L 9/50 |
| 12,321,924 | B1* | 6/2025 | Kurani | G06Q 40/04 |
| 12,417,449 | B2* | 9/2025 | Robell | G06Q 20/3672 |
| 2016/0021093 | A1* | 1/2016 | Vinckier | H04L 67/10 |
| | | | | 726/9 |
| 2017/0310653 | A1* | 10/2017 | Zhang | H04L 63/0838 |
| 2021/0152365 | A1* | 5/2021 | Nosseir | H04L 9/321 |
| 2021/0383377 | A1* | 12/2021 | Zhou | H04L 9/3213 |
| 2023/0114684 | A1* | 4/2023 | Jakobsson | H04L 9/3213 |
| | | | | 713/159 |
| 2023/0144857 | A1* | 5/2023 | Khan | H04L 9/30 |
| | | | | 713/168 |
| 2023/0230066 | A1* | 7/2023 | Jakobsson | G06Q 20/3829 |
| | | | | 705/67 |
| 2023/0259918 | A1* | 8/2023 | Rao | G06Q 20/4014 |
| | | | | 705/67 |
| 2023/0281604 | A1* | 9/2023 | Robell | G06Q 30/018 |
| 2023/0379160 | A1* | 11/2023 | Ferenczi | H04L 9/0863 |
| 2024/0078537 | A1* | 3/2024 | Sandford | G06Q 20/38215 |
| 2024/0261692 | A1* | 8/2024 | Sliwka | H04L 9/3213 |
| 2024/0372697 | A1* | 11/2024 | Kobel | H04L 9/085 |
| 2024/0372731 | A1* | 11/2024 | Kobel | H04L 9/3239 |
| 2025/0055692 | A1* | 2/2025 | Ferenczi | H04L 63/0823 |
| 2025/0069067 | A1* | 2/2025 | Kurani | G06Q 40/04 |
| 2025/0274280 | A1* | 8/2025 | Kurani | H04L 9/088 |

FOREIGN PATENT DOCUMENTS

| | | |
|---|---|---|
| CN | 114598531 A | 6/2022 |
| CN | 115834630 A | 3/2023 |
| CN | 115843368 A | 3/2023 |

OTHER PUBLICATIONS

Binance, "Playing by the Rules: KYC at Binance", Binance Blog, 2023. URL: https://www.binance.com/en/blog/community/playing-by-the-rules-kyc-at-binance-3957562386953350877.

AZCoinNews, "Sandbox Metaverse Game Enhances User Security With KYC Verification For Staking", Binance Square, 2023. URL: https://www.binance.com/en/square/post/905780.

Fecoxa, "KYC The Sandbox para ganhar Rewards | NFT p2e", Youtube Shorts, Aug. 6, 2022. URL: https://www.youtube.com/shorts/Gm4dgXEb98M.

World Wide Web Consortium, "Types of documents W3C publishes", Web Standards, downloaded on Jun. 13, 2024. URL: https://www.w3.org/standards/types/#REC.

World Wide Web Consortium, "Verifiable Credentials Data Model v1.1", W3C Recommendation, 2022. URL: https://www.w3.org/TR/vc-data-model/.

* cited by examiner

SYSTEM AND METHOD USING IDENTITY NON-FUNGIBLE TOKEN FOR IDENTITY VERIFICATION IN METAVERSE AND ONLINE SERVICES

TECHNICAL FIELD

The present invention relates to identity verification using blockchain technologies; and in particularly to systems and methods using identity non-fungible tokens for identity verification in metaverse and online services.

BACKGROUND

Identity authentication is a critical aspect of online security, ensuring that individuals are who they claim to be when accessing digital services and platforms. In today's digital landscape, the prevalence of identity theft and fraudulent activities underscores the importance of robust authentication mechanisms to safeguard users' personal information and privacy.

One key consideration in identity authentication is preserving users' privacy while verifying their identities. Some traditional authentication methods that utilize image or video capturing are easy to deceive the verifiers using fake or stolen identity cards, even deepfake images, or other false information. Moreover, in some less reputable online services, it might not be safe for a user to disclose their complete personal information to the services. To address these concerns, it is essential to empower users with greater control over the disclosure of their personal attributes.

Furthermore, the emergence of virtual environments, such as the metaverse and WEB 3 projects (e.g., SocialFi), introduces new challenges for identity authentication. In these immersive digital spaces, users interact with each other and engage in various activities using digital avatars. However, verifying the real identities behind these avatars poses significant challenges, as existing authentication mechanisms may not be applicable in virtual contexts.

Therefore, there is a need for innovative authentication solutions tailored to the unique characteristics of virtual environments, to maintain online security and protect users' personal information, further ensuring the safety and authenticity of user identities.

SUMMARY OF INVENTION

In accordance with a first aspect of the present invention, a system for identity authentication on blockchain using non-fungible tokens (NFTs) is provided. The system includes a user interface, an identity NFT minting module, and a verifiable credential issuer module. The user interface allows a user to link a blockchain wallet and a credential wallet to the user interface and to provide an online service ID and is configured to request the user to create a signature using a blockchain wallet private key and to create a signature using a credential wallet signing key. The user's credential wallet is identified by decentralized identifier (DID) of the user, and the user's blockchain wallet is identified by a blockchain wallet address thereof. The identity NFT minting module is configured to receive information, requests, and the signatures from the user interface. The identity NFT minting module is configured to verify the online service ID owned by the user and to verify the two signatures of the user using the blockchain wallet address and the DID, respectively. The identity NFT minting module is further configured to mint an identity NFT on a blockchain network by an identity NFT minter, when the verifying succeeds, preserving the online service ID, the blockchain wallet address, and the DID in the identity NFT as metadata. The verifiable credential issuer module is configured to receive information, requests, and the signatures from the user interface. The user interface enables the user to provide the DID and personal status information to the verifiable credential issuer module and request an issuance of a credential from the verifiable credential issuer module. The verifiable credential issuer module is further configured to issue a verifiable credential to the user and to trigger the identity NFT minting module for adding credential metadata related to the issued verifiable credential to the identity NFT by the identity NFT minter, upon the request from the user interface to the verifiable credential issuer module has been confirmed.

In accordance with a second aspect of the present invention, a method for identity authentication on blockchain using NFTs is provided. The method includes the process steps as follows: requesting a user, by a user interface, to link a blockchain wallet and a credential wallet to the user interface and to provide an online service ID; requesting the user, by the user interface, to create a signature using a blockchain wallet private key and to create a signature using a credential wallet signing key, wherein the user's credential wallet is identified by decentralized identifier (DID) of the user, and the user's blockchain wallet is identified by a blockchain wallet address thereof; receiving information, requests, and the signatures from the user interface by an identity NFT minting module; verifying, by the identity NFT minting module, the online service ID owned by the user; verifying, by the identity NFT minting module, the two signatures of the user using the blockchain wallet address and the DID, respectively; minting an identity NFT, by the identity NFT minting module, on a blockchain network via an identity NFT minter, when the verifying succeeds, preserving the online service ID, the blockchain wallet address, and the DID in the identity NFT as metadata; receiving, by a verifiable credential issuer module, the DID and personal status information of the user and a request for an issuance of a credential via the user interface from the user; issuing, by the verifiable credential issuer module, a verifiable credential to the user; and triggering, by the verifiable credential issuer module, the identity NFT minting module for adding credential metadata related to the issued verifiable credential to the identity NFT via the identity NFT minter, upon the request from the user interface to the verifiable credential issuer module has been confirmed.

In the various embodiments of the present invention, user identities are tightly coupled to comprehensive profiles, ensuring a holistic understanding. The system verifies certified identity IDs and credentials, giving assurance of authenticity. Users control the scope of disclosed credentials, enhancing privacy. Identity verification is reliable via public blockchain, boosting trust. Cryptography safeguards privacy and deters forgery. Real-time interaction among parties ensures up-to-date verification. Identity IDs and credentials can be attached to avatars seamlessly.

BRIEF DESCRIPTION OF DRAWINGS

Embodiments of the invention are described in more details hereinafter with reference to the drawings, in which.

DETAILED DESCRIPTION OF THE INVENTION

In the following description, systems and methods using identity non-fungible tokens (NFTs) for identity verification in metaverse and online services and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
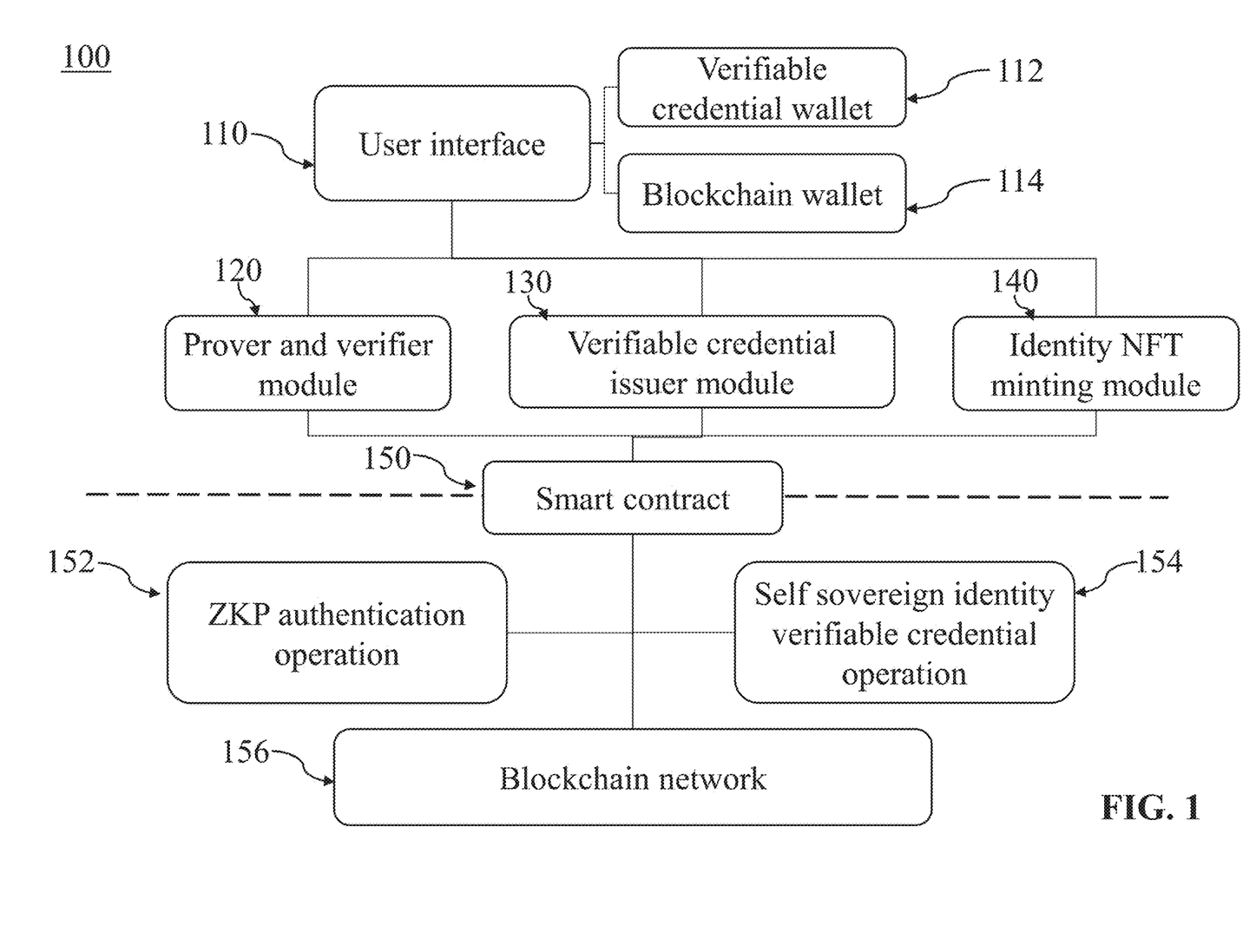
FIG. 1 depicts a schematic architecture of a system for identity authentication on blockchain using NFTs according to one embodiment of the present invention.

Referring to FIG. 1 for the following description. The system 100 has an architecture by deploying a user interface 110, a prover and verifier module 120, a verifiable credential issuer module 130, and an identity NFT minting module 140. These functional components communicate with each other, typically via the Internet, allowing for the flow of information or digital data among them. They interact with on-blockchain data through smart contract 150. For example, at least one of them performs zero-knowledge proofs (ZKP) authentication operations 152 or self-sovereign identity (SSI) verifiable credential operations 154 on the blockchain, or further upload data to the blockchain network 156 for storage.

The user interface 110 is presented on web browsers for user operation. In one embodiment, the user interface 110 is a website browser that utilizes browser extensions for users to operate a verifiable credential wallet 112 and a blockchain wallet 114, such as MetaMask, Phantom, or other decentralized wallets. The user interface 110 can also be implemented as mobile applications on portable electronic devices. A prover uses the user interface 110 to initiate identity verification. For example, the user interface 110 allows a user to link the verifiable credential wallet 112 and the blockchain wallet 114 to the user interface and to provide user's online service ID (e.g., avatar ID). When any request for signature is required, the user interface 110 requests the user to create a signature of the blockchain wallet private key and a signature of the credential wallet signing key.

In accordance with the various embodiments of the present invention, the prover and verifier module 120, the verifiable credential issuer module 130, and the identity NFT minting module 140 collaborate to offer an identity NFT to a user and to enable identity verification based on this NFT. Each identity NFT uniquely represents a user and securely connects user identities across the metaverse, online services, blockchain, and the real world. The prover and verifier module 120, the verifiable credential issuer module 130, and the minting informing module 140 are configured to receive information, requests, and signatures from the user interface 110, or request desired actions or information from it.

The identity NFT minting module 140 is configured to issue identity NFTs for users. For instance, an identity NFT minter may provide one identity NFT to a user through the identity NFT minting module 140. In one embodiment, user identity and metadata of verifiable credentials, such as name, national ID, income, age, avatar ID, online service user ID, blockchain wallet address, and decentralized identifier (DID), are stored in the issued identity NFT.

The prover and verifier module 120 is configured to conduct identity verification for user who holds an identity NFT upon receiving a request from the user. Through the prover and verifier module 120, a verifier locates an identity NFT of an avatar/online service user, confirms the user ownership of the NFT, and verifies the real-world credentials.

The verifiable credential issuer module 130 is configured to receive requests from at least one user for an issuance of a credential via the user interface 110 and to determine whether to issue a verifiable credential to the user. The verifiable credential issuer module 130 further triggers the identity NFT minting module 140 for adding credential metadata to the identity NFT, upon the request has been confirmed.

Figure 2:
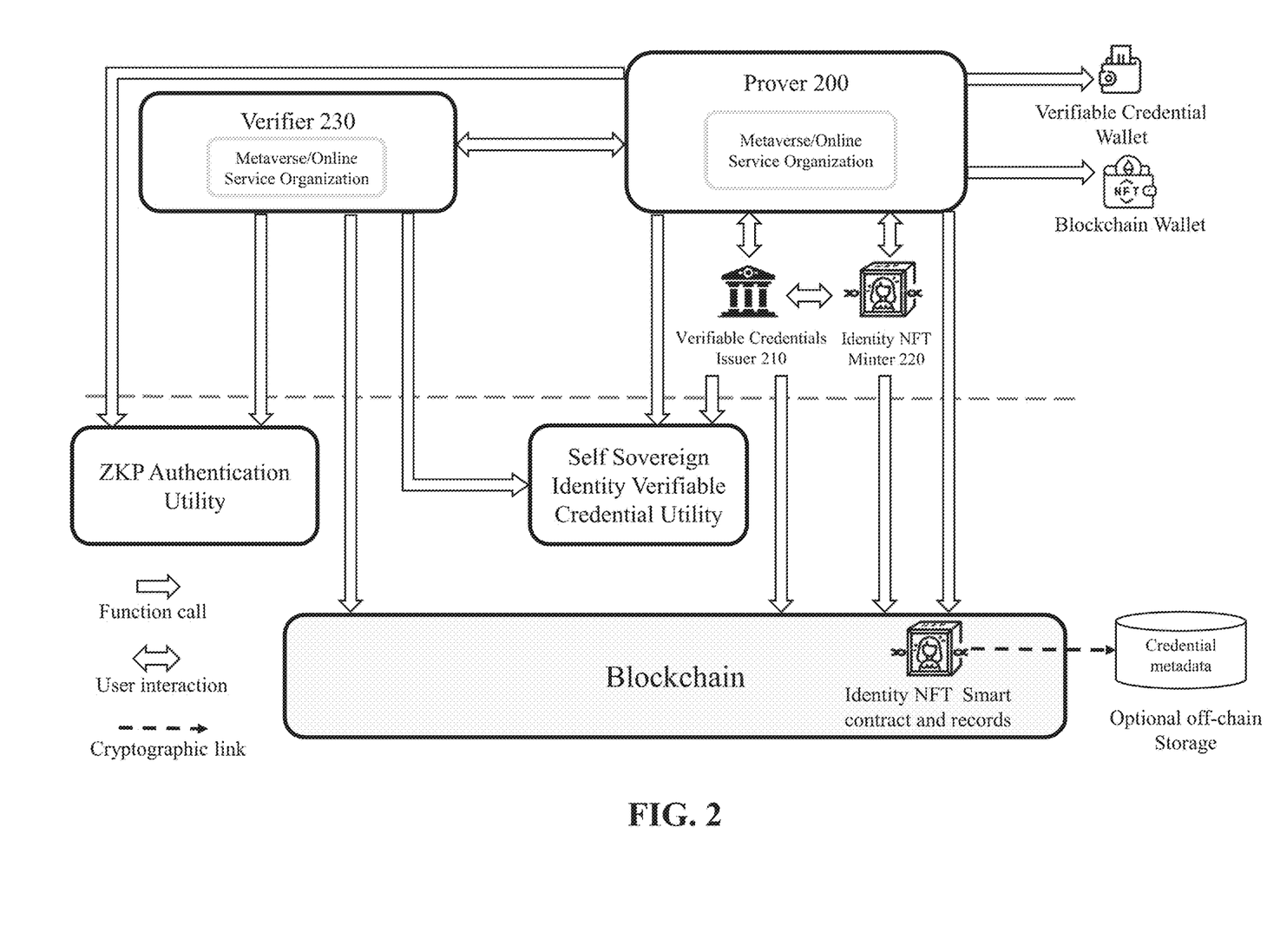
FIG. 2 depicts a schematic diagram of various users interacting with each other in the system according to one embodiment of the present invention.

In the schematic diagram provided in FIG. 2, various users interacting with each other in the system 100 are depicted. This serves as an example to further elucidate the details of the processes as afore-described. The processes include: stage (a) minting an identity NFT by an identity NFT minter 220 for a user (i.e., to be a prover 200); stage (b) issuing, by a verifiable credentials issuer 210, verifiable credentials to the user and triggering the identity NFT minter 220 to store the metadata (only the metadata) of the verifiable credentials into the identity NFT; and stage (c) generating and verifying verifiable credential proofs by a verifier 230.

Figure 3:
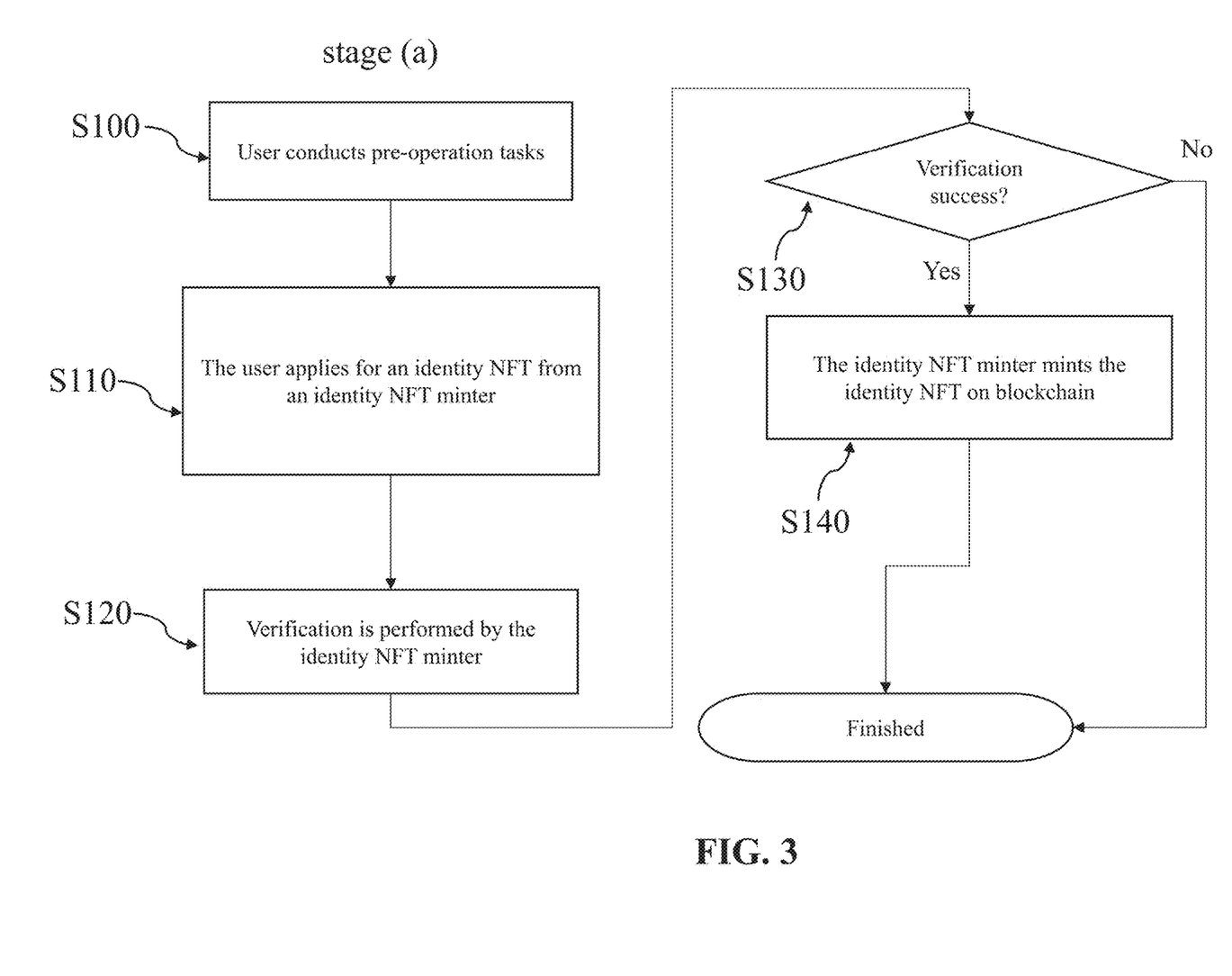
FIG. 3 depicts a flowchart for stage (a), minting the identity NFT, according to one embodiment of the present invention.

In stage (a), minting the identity NFT, basically, the user and the identity NFT minter 220 involve the interaction, as a flowchart shown in FIG. 3. Stage (a) includes steps S100, S110, S120, S130, S140. These steps of stage (a) is at least executed by the identity NFT minting module 140.

In step S100, the user prepares a credential wallet identified by DID (e.g., the verifiable credential wallet 112), which is cryptographically associated to the wallet's signing key known only to the user. The user also creates a blockchain wallet (e.g., the blockchain wallet 114) identified by its wallet address and associated with a private key known only to the user. In addition, based on the example involving an application for a metaverse platform or online service, the user has signed up to the metaverse platform/online service and received an avatar ID/online server user ID corresponding to the same.

In step S110, the user applies for an identity NFT from an identity NFT minter. In order to apply an identity NFT, the user operates the user interface 110 and provides information to the identity NFT minter 220 via the identity NFT minting module 140, at least including (1) avatar ID/online server user ID; (2) address for the blockchain wallet 114; (3) DID; and (4) two ZKP commitment values of the user's two secrets. In one embodiment, the two secrets include an identity secret and a dynamic secret, with one of the secrets being a time-limited secret. The user is required to periodically use a different secret and the corresponding commitment value for it to be recognized for authentication. The user may create a signature of the request using the blockchain wallet private key and create a signature of the request using credential wallet signing key, via operating the user interface 110.

In step S120, the identity NFT minter 220 verifies the user truly owns avatar ID/online service user ID. The verification method is dependent on what is supported by the metaverse/online service. In one embodiment, if the mentioned ID contains an email or phone number, the identity NFT minter 220 may verify the ID by sending a validation code by email or SMS message to the user and demand the same to reply with the validation code. In another embodiment, the user operates the user interface 110 on site at a place with the identity NFT minter 220 and then signs into the metaverse/online service to display the own avatar ID/online service user ID for the identity NFT minter 220. Also, the identity NFT minter 220 operates the identity NFT minting module 140 to verify the two signatures of the user using the blockchain wallet address and the DID, respectively.

In step S130, once step S120 is verified by the identity NFT minting module 140, the next is step S140. The identity NFT minting module is configured to mint an identity NFT on a blockchain network via the identity NFT minter 220, when the verifying succeeds, saving the avatar ID/online server user ID, blockchain wallet address (e.g., wallet address that the NFT is issued to), and DID (e.g., ID of credential wallet containing a set of verifiable credentials) as metadata within the minted identity NFT. In various embodiments, the mentioned wallet address is on Ethereum, other EVM, Solana, BSC, or any layer one or layer two chain. For "minting the identity NFT", the identity NFT minter 220 records the identity NFT on private or public blockchain. The identity NFT contains a data element stating the blockchain wallet address above is the owner of the identity NFT. Once step S130 shows a failed verification, the process is aborted. The user can check the state of own identity NFT in the blockchain wallet 114 after stage (a).

Figure 4:
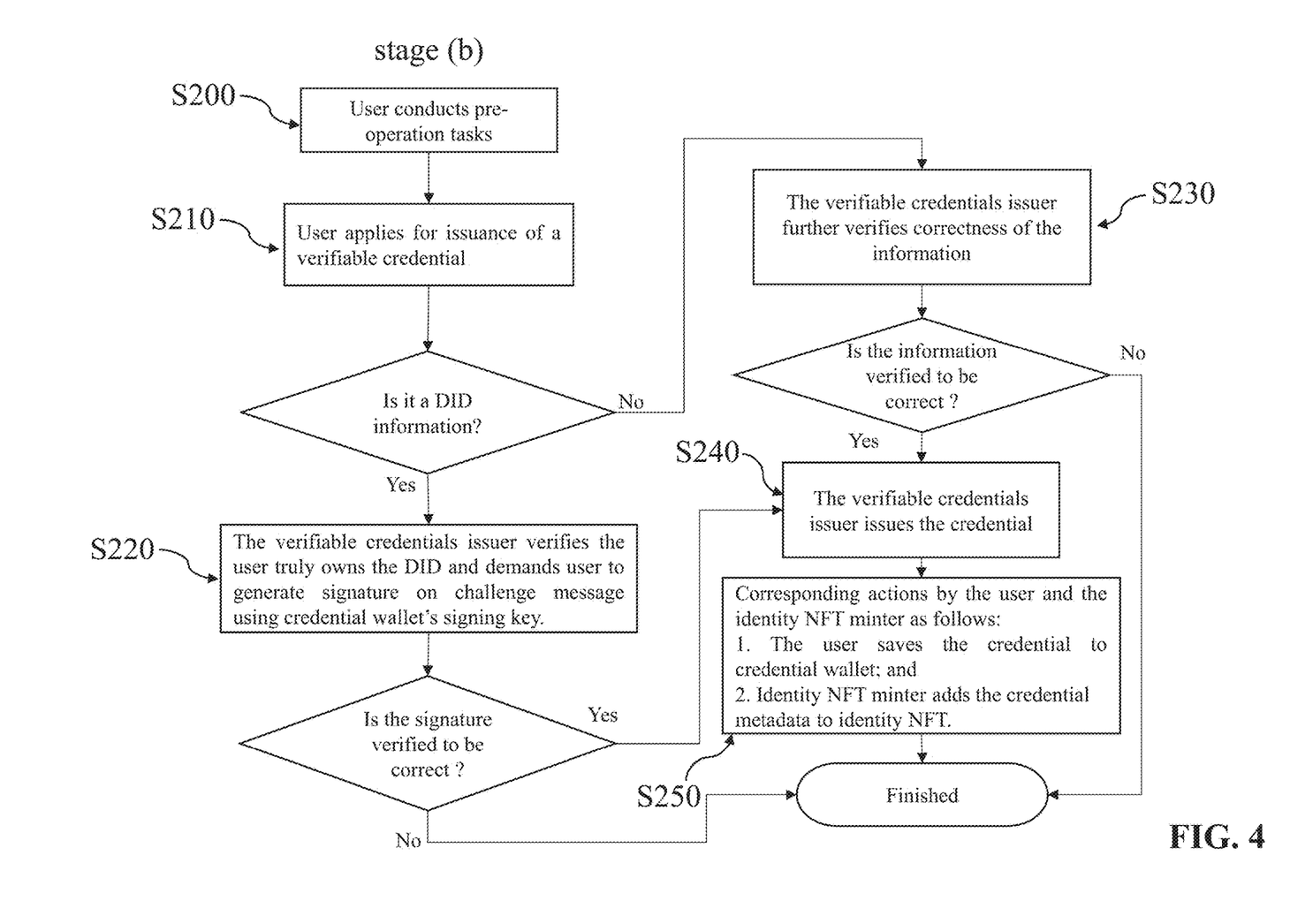
FIG. 4 depicts a flowchart for stage (b), issuing verifiable credentials to the identity NFT, according to one embodiment of the present invention.

In stage (b), issuing verifiable credentials, basically, the user, the verifiable credentials issuer 210, the identity NFT minter 220 involve the interaction, as a flowchart shown in FIG. 4. Stage (b) includes steps S200, S210, S220, S230, S240, S250. These steps of stage (b) are executed by the verifiable credential issuer module 130 and the identity NFT minting module 140.

In step S200, the user prepares a credential wallet identified and an identity NFT minted in stage (a).

In step S210, to apply for issuance of a verifiable credential, the user operates the user interface 110, provides own information to the verifiable credentials issuer 210 and further requests for issuance of a credential of the information. In one embodiment, the information includes DID, age, income, etc.

After step S210, the verifiable credential issuer module 130 determines whether the information in step S210 is DID information. If so, the next is step S220. In step S220, the verifiable credentials issuer 210 verifies the user truly owns the DID. For example, the verifiable credentials issuer 210 sends the user a challenge message and demands the same to use the credential wallet's signing key to sign on the challenge message. Then, the verifiable credentials issuer 210 verifies the signature using the DID, and the next is step S240 once the signature is verified to be correct.

After step S210, if the verifiable credential issuer module 130 determines the information in step S210 is not DID information, the next is step S230. In step S230, the verifiable credentials issuer 210 verifies the correctness of the information provided in step S210 through other methods it deems appropriate. Then, the verifiable credentials issuer 210 verifies the information verified to be correct.

The next is step S240 once the verification result in step S220 or S230 is found affirmative. In step S240, since the information provided by the user has been verified (i.e., has been confirmed/is accepted), the verifiable credentials issuer 210 issues the credential by using the verifiable credential issuer module 130 to achieve: (1) signing the credential; (2) storing credential validity status to blockchain; (3) sending the credential to the user; and (4) sending/forwarding the credential metadata to the identity NFT minter 220 via the identity NFT minting module 140.

In step S250, the user saves the credential to own credential wallet (e.g., credential wallet 112) via the user interface 110, and the identity NFT minter 220 adds the credential metadata to the identity NFT. For the determination which is negative (i.e., verified as No), the process is aborted.

Figure 5:
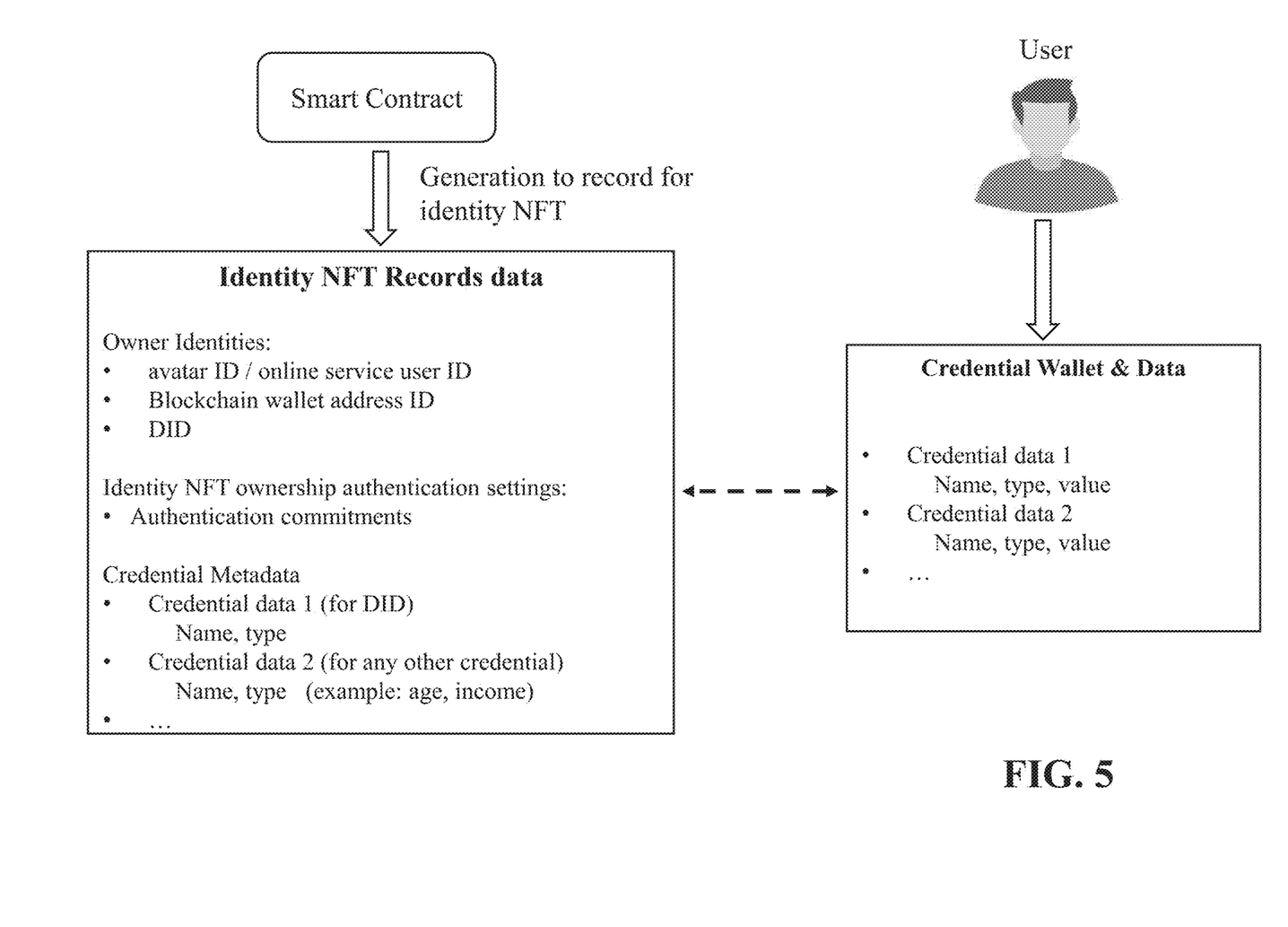
FIG. 5 depicts a schematic diagram of stage (b) according to one embodiment of the present invention.

FIG. 5 depicts a schematic diagram of stage (b) according to one embodiment of the present invention. The labeled "user" is the identity NFT owner and the credential wallet holder, who creates a credential wallet with a unique DID and stores credential data into the wallet. The data storage is achieved through any private access-only storage and is identified by a DID. In this regard, the DID is cryptographically associated with a master key and a signing key of the holder's wallet. The wallet holder uses the signing key to prove ownership of the DID and uses the master key to create credential proofs.

Once the information provided by the user is verified, confirmed and accepted, the verifiable credentials issuer 210 forwards the information to the identity NFT minter 220 so the identity NFT minter 220 interacts with an identity NFT smart contract, which is deployed in blockchain, to generate a record for the targeted identity NFT, thereby storing the metadata (only the metadata) of the verifiable credentials into the identity NFT. The content of the verifiable credentials, on the other hand, is stored in user's credential wallet. The identity NFT records data including owner identities, identity NFT ownership authentication settings, and credential metadata. Such the data storage is achieved by Blockchain ledger with public access and is identified by the identity NFT ID (i.e., every identity NFT has a unique ID). In one embodiment, credential metadata for each identity NFT is stored in the identity NFT record on the blockchain. In another embodiment, credential metadata is stored in off-chain storage. For example, as shown in FIG. 2, to reduce blockchain resource usage, an identity NFT may opt to store the metadata in off-chain storage, such as interplanetary file system (IPFS).

That is, the user and the verifiable credentials issuer 210 invoke the function of the SSI verifiable credential utility within the SSI verifiable credential operation 154 to achieve the decentralized management of digital identities. The SSI verifiable credential operation 154 enables users to self-manage their verifiable credentials without relying on third-party providers to store and centrally manage the data. Specifically, the SSI verifiable credential operation 154 for SSI management includes: (1) the verifiable credentials issuer 210 issuing real-world credentials to the user; (2) the user controlling the disclosure of their own real-world credentials; (3) the user disclosing the content of their own verifiable credentials or only proving that their verifiable credentials match certain criteria; and (4) the verifiable credential verification being protected by blockchain security.

After stage (b), the state is defined as the user already possessing an identity NFT, which functions for the purpose of managing and verifying digital identity and credentials. Specifically, the utility of the identity NFT includes: authentication of identity NFT ownership with zero-knowledge-proof, storage of owner IDs (Avatar ID/online service user ID, blockchain wallet address, DID); storage of verifiable credential metadata (personal information). As such, the NET holder can establish identity across three realms (i.e., metaverse/online service, blockchain, and real world). The identity NFT provides a multi-factor authentication to verify NFT ownership, support verifiable credential issuance and verification, and it is non-transferable (e.g., soul-bound token).

Figure 6:
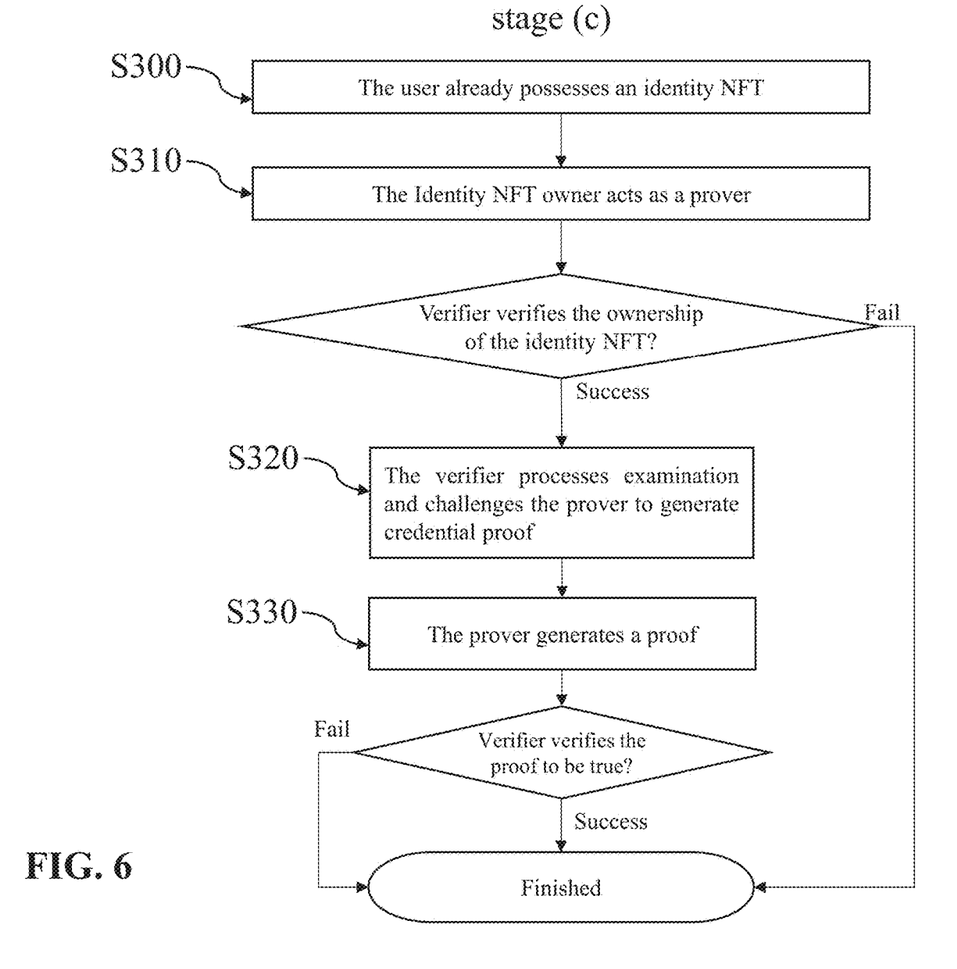
FIG. 6 depicts a flowchart for stage (c), generating and verifying verifiable credential proofs, according to one embodiment of the present invention.

In stage (c), generating and verifying verifiable credential proofs, basically, the user, the identity NFT minter 220, and the verifier 230 involve the interaction, as a flowchart shown in FIG. 6. Stage (c) includes steps S300, S310, S320, S330. These steps of stage (c) are executed by the prover and verifier module 120. In stage (c), the goal is to provide an identity NFT ownership authentication mechanism protected by using blockchain public key cryptography and zero-knowledge proof based multi-factor factor authentication, as well as a mechanism for a verifier to locate identity NFT of an avatar/online service user, authenticate the user ownership of the identity NFT and to verify the user real-world credentials.

In step S300, the user already possesses an identity NFT minted in stage (a) and storing the information as aforementioned in stage (b). In this regard, when identity NFT minter 220 mints an identity NFT, the identity NFT owner creates two secret values and apply zero-knowledge proof to generate two corresponding commitment values to be stored inside the identity NFT by the identity NFT minter 220. In one embodiment, the identity NFT minter 220 executes the ownership authentication to verify the user's proof and the commitment values before storing the commitment values in the identity NFT.

In step S310, the user who is an identity NFT owner signs into a metaverse world and an environment of WEB 3 projects and then acts as a prover 200, presenting the identity NFT to the verifier 230 for going through the ownership authentication steps. When the verifier 230 meets the prover 200 on the corresponding metaverse or online service, the verifier 230 retrieves avatar ID or online service user ID of the prover 200. In one embodiment, the verifier 230 searches the blockchain for an identity NFT containing the avatar ID or online service user ID of the prover 200. In another embodiment, the prover 200 provides the verifier 230 with the ID of the own identity NET containing the paired avatar ID or online service user ID.

The verifier 230 verifies the ownership of the identity NFT for the prover 200. The prover 200 needs to prove that the prover 200 owns the private key of the blockchain wallet (e.g., the blockchain wallet 114) owning the identity NFT. The prover 200 signs the claim, which contains a challenge message from the verifier 230, with the blockchain wallet private key of the prover 200. The signature is verified by the verifier 230 using the blockchain wallet address in the identity NFT.

Then, the prover 200 proves knowledge of two secrets behind the two commitment values in the identity NFT, which begins from that the verifier 230 sends a one-time only challenge code to the prover 200; correspondingly, the prover 200 uses zero-knowledge proof cryptography to create a ZKP proof using the two secret values and the challenge code. After creating the ZKP proof, the verifier 230 verifies the ZKP proof by applying zero-knowledge proof cryptography to verify the ZKP proof against the two commitment values and the challenge code.

Figure 7:
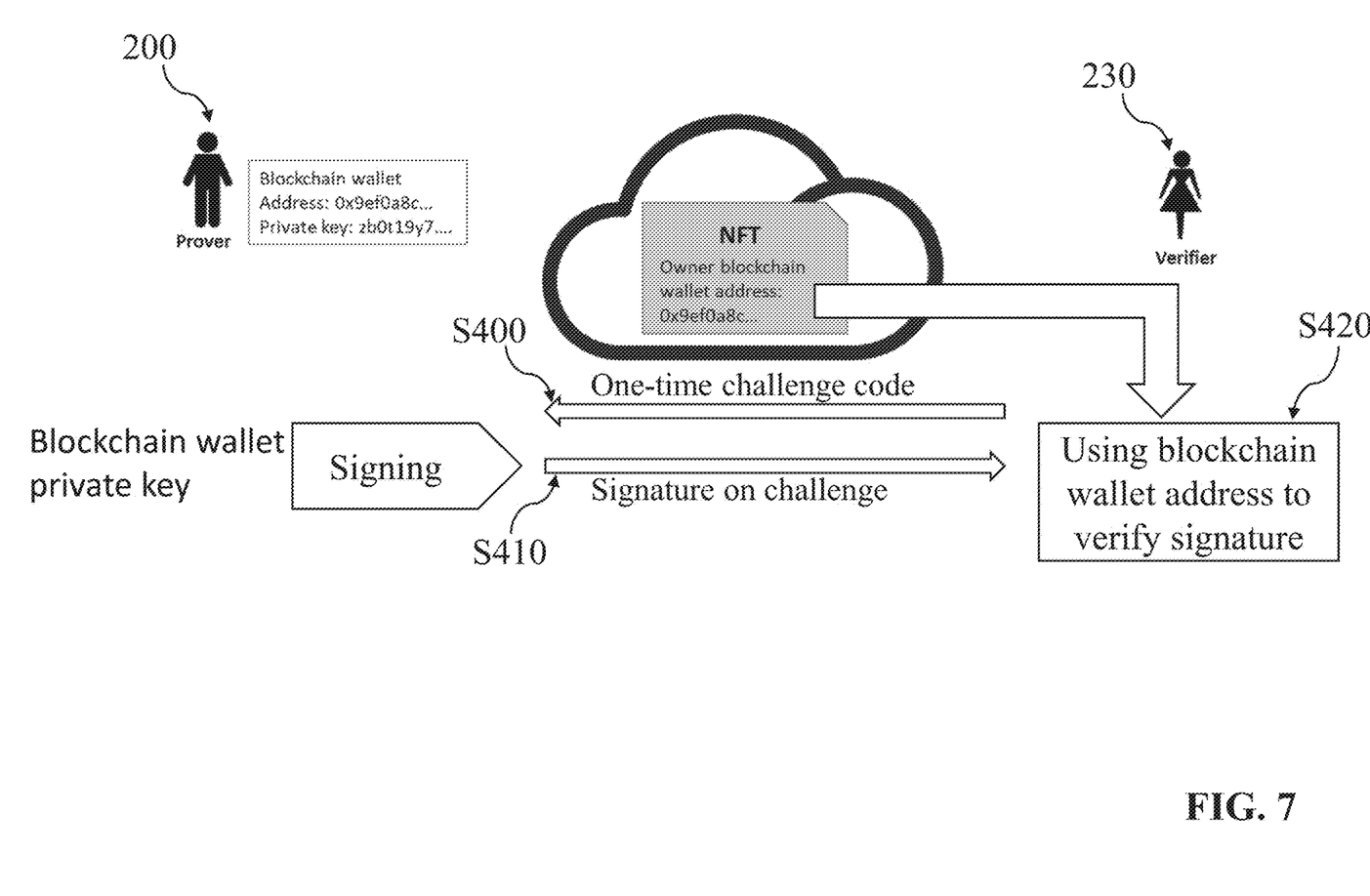
FIG. 7 depicts a schematic drawing for blockchain wallet private key verification of phase I according to one embodiment of the present invention.
Figure 8:
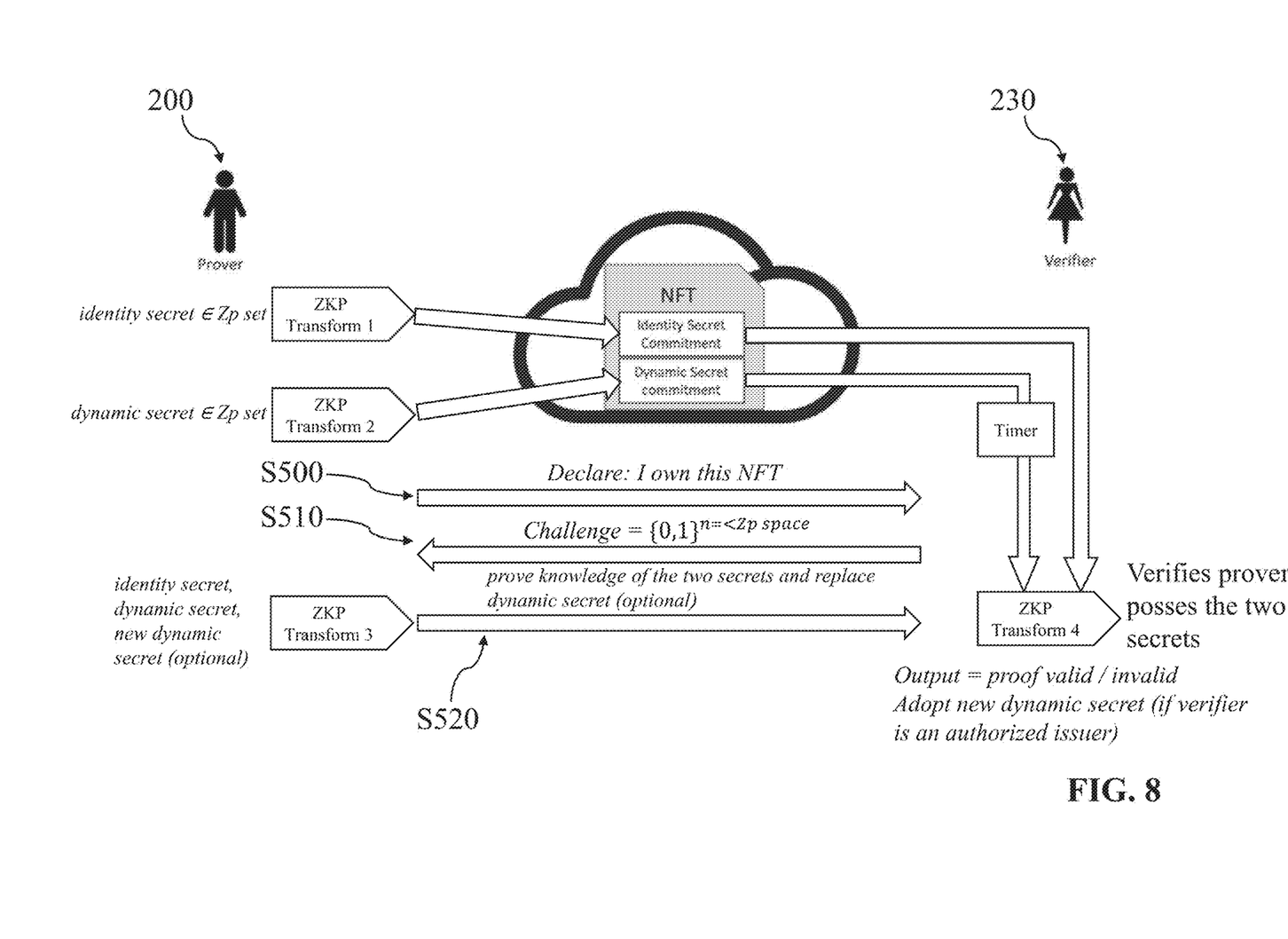
FIG. 8 depicts a schematic drawing for zero-knowledge proof ownership authentication of phase II according to one embodiment of the present invention.

In one embodiment, to prove the ownership of an identity NFT, zero-knowledge proof based the identity NFT ownership multi-factor authentication is applied, and the prover 200 needs to go through two phases, including phase I "blockchain wallet private key verification" and phase II "zero-knowledge proof ownership authentication".

FIG. 7 depicts a schematic drawing for blockchain wallet private key verification of phase I according to one embodiment of the present invention. Phase I include steps S400, S410, and S420. In step S400, the verifier 230 sends a one-time challenge code to the prover 200. In step S410, the prover 200 signs the one-time challenge code from the verifier 230 with the own blockchain wallet private key and sends the signature back to the verifier 230; for example, the illustration of FIG. 7 shows the prover 200 has a blockchain wallet with address "0x9e . . . " and private key "zb0t . . . " In step S420, the verifier 230 verifies the signature with the blockchain wallet address in the identity NFT to confirm the prover 200 possesses the corresponding private key. In the illustration, the one-time challenge code is applied to prevent signature replay.

FIG. 8 depicts a schematic drawing for zero-knowledge proof ownership authentication of phase II according to one embodiment of the present invention. In one embodiment, secrets and commitments are used in this stage, while the identity NFT only stores zero-knowledge proof commitments (i.e., not secrets themselves), and identity secret and dynamic secret are only kept to the prover. For example, two zero-knowledge proof commitment values are stored in the identity NFT of the prover by the authorized issuer, and: (1) identity secret∈Zp set; and (2) dynamic secret∈Zp set, which are never disclosed to any verifier. In the illustration, blocks for "ZKP Transform" are operations for zero-knowledge proof calculations. These blocks are built for transforms by using elliptic curve points addition/multiplication: $P_1+P_s$, nP, discrete $\log_p$ n; e.g., $z=SHA2(n) \bmod(p)*G + 2m*P_1$.

Phase II include steps S500, S510, and S520. In step 500, the prover sends a message to the verifier, so as to declare that the prover owns the target identity NFT. In step S510, the verifier sends a challenge code that $\{0,1\}^{n=<Zp\ space}$, for verifying the prover's knowledge of commitment secrets: the identity secret and the dynamic secret. In one embodiment, a challenge-response protocol is applied to prevent proof replay. In step S520, the prover proves knowledge of the two secrets to the verifier. In one embodiment, the prover proves knowledge by further using a new dynamic secret, which is optional; for example, if the verifier is an authorized issuer, the verifier adopts new dynamic secret. In this regard, for better protection, the dynamic secret is periodically updated with a new secret. In one embodiment, each secret (e.g., identity secret) is made to comprise multiple sub-secrets, thus increasing the difficulty of hacker attacks, in which the sub-secrets may then be combined to become a single secret with a corresponding secret commitment. After step S520, the verifier verifies the proof from the prover and outputs whether the proof is valid of invalid.

Once the proof from the prover has been verified, the state that prover possesses the two secrets is verified, and the identity NFT ownership is authenticated.

Phase II is established by using zero-knowledge proof mathematic basis, such as elliptic curve cryptography curve: $y^2=x^3+ax+b \bmod(p)$ having order n, cofactor h, base point G, field size p. Information regarding setup for this is described herein.

The identity NFT contains two commitment values that are added to it when it is minted. The commitment values are generated in the following manner.

(1) The prover sets up two secrets and keeps them to himself. The secrets are:
  a) an identity secret $k \in \mathbb{Z}_p$; the prover calculates the identity secret commitment through ZKP Transform 1: $Z=k \cdot G$;
  b) a dynamic secret $r \in \mathbb{Z}_p$; the prover calculates the dynamic secret commitment through ZKP Transform 2: $X=r \cdot G$;
(2) The prover discloses commitments Z and X to identity NFT minter who stores them in the identity NFT and make them visible to the public.

Proof and Verification Procedure:

When the prover subsequently declares ownership of the identity NFT to the verifier, the followings are performed by:
  (a) Prover claims the ownership of the identity NFT;
  (b) Verifier selects a challenge code $e \in \mathbb{Z}_p$ and pass to the prover;
  (c) Prover applies the two secrets and the challenge code to ZKP Transform 3 which generates the proof as: $y=(k \cdot e+r) \bmod p$;
  (d) Verifier retrieves the two commitments (Z and X) in the identity NFT, then applies the proof to the following ZKP Transform 4 operation: $res=y \cdot G - e]Z$;
  (e) Verifier checks whether "res" and X are identical; if yes, then the proof is valid.

It is noted why res and X should be identical:

$$y \cdot G - e \cdot Z = (ke+r) \cdot G - e \cdot k \cdot G = e \cdot k \cdot G + r \cdot G - e \cdot k \cdot G = r \cdot G = X$$

In one embodiment, the prover changes own dynamic secret r to further enhance security if the dynamic secret has been set for a long time.

Referring to FIG. 6, after step S310, as the verifier 230 verifies the ownership of the identity NFT of the prover 200 and it succeeds, the next is step S320. In step S320, the verifier 230 examines the credential metadata in the identity NFT for the list of credentials (i.e., their names and types). For each credential, the verifier 230 requests prover's proof of the full content of the credential or proof of credential fulfilling certain requirements. Similarly, the request contains a unique challenge code to prevent proof replay. In step S330, the prover 200 generates a proof by utilizing the verifier's proof request, credential metadata stored in the identity NFT, and the credentials from the prover's credential wallet. After step S330, once the verifier 230 verifies the proof from the prover 200 to be true, stage (c) (i.e., generating and verifying the verifiable credential proofs) succeeds, otherwise, the verification fails.

In one embodiment, in steps S320 and S330, the verifier 230 verifies the prover's ownership of the DID stored in the identity NET by challenging to the prover 200, including requesting the prover 200 to sign a challenge message with the credential wallet signing key. The verifier 230 then verify the signature using the DID. The verifier 230 also requests the prover 200 to create a verifiable credential proof confirming the own DID value. Further, the verifier 230 proceeds to verify real world information of the prover 200 by requesting the prover to disclose the prover's credentials. In one embodiment, the verifier 230 requests the prover 200 to disclose the full content of a subset of verifiable credentials and to generate proof of another subset of verifiable credentials to prove that they comply with fulfill specific requirements.

In stage (c), a credential proof cannot be built or is rejected by the prover and verifier module 120 if:
  (a) it is inconsistent with the issued credential's content; or
  (b) it is built from a credential that has been revoked by credential issuer; or
  (c) it is built from credentials of another DID that prover owns; or
  (d) it is built from credentials issued by an unrecognized credential issuer; or
  (e) it is built from credentials of another user; or
  (f) it is a replica of a credential proof of another individual/organization; or
  (g) it is modified to link it to validity status (in blockchain) of another user's credential.

Figure 9:
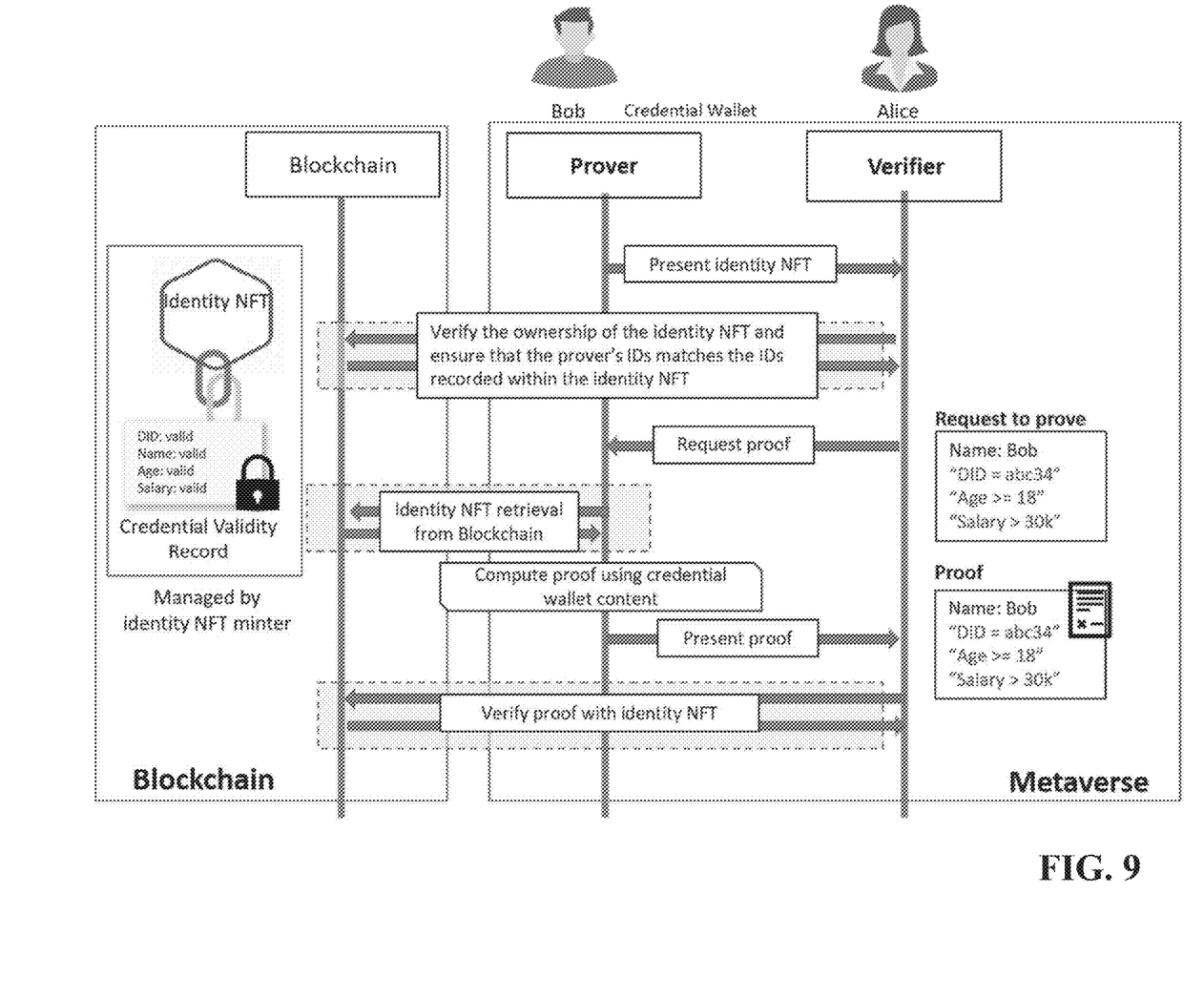
FIG. 9 depicts a practical scenario diagram for identity NFT ownership and verifiable credential verification according to one embodiment of the present invention.

FIG. 9 depicts a practical scenario diagram for identity NFT ownership and verifiable credential verification according to one embodiment of the present invention. It sets prover is with DID: abc34; Name: Bob; Age: 21; Salary: 45 k, which are stored in a credential wallet, and the prover owns an identity NFT. To go through the verification, at the beginning, the prover operates a user interface (e.g., the user interface 110 of FIG. 1) to present his identity NFT (i.e., the prover's identity NFT) to Alice, who serves as a verifier in the scenario. The presentment from the prover is received by the prover and verifier module (e.g., the prover and verifier module 120 of FIG. 1). The verifier then, via the prover and verifier module interacting with the blockchain network, verifies the ownership of the identity NFT of the prover and ensures that the prover's IDs matches the IDs recorded within the same identity NFT. After the ownership of the identity NFT is verified and the result is received by the prover and verifier module from the blockchain network, the verifier requests a proof from the prover via the user interface and the prover and verifier module. The proof includes: DID: abc34; Name: Bob; Age>=18; Salary>30 k. The prover then retrieves the identity NFT from the blockchain network via operating the user interface. The result from the identity NFT retrieval is sent back from the blockchain network for computing the proof using credential wallet content. Thereafter, the prover presents the proof to the verifier, which is received by the prover and verifier module and shows: DID: abc34; Name: Bob; Age>=18; Salary>=30 k. At the final stage, the verifier requests necessary information from blockchain (e.g. credential metadata, credential validity status), and performs verification using the prover and verifier module; the verifier then sees whether the verification succeeded or failed.

In various embodiments, the prover and verifier module (e.g., the prover and verifier module 120 of FIG. 1) is configured to reject or defend possible attacks by counterfeiter, including identity NFT ownership theft, verifiable credential proof forgery, verifiable credential proof with incorrect credential information, verifiable credential proof that is inconsistent with the issued credential, verifiable credential proof built from issued credential that has been revoked by credential issuer, verifiable credential proof built from credentials of another DID that the same prover owns, verifiable credential proof built from credentials issued by unrecognized credential issuers, verifiable credential proof theft, using another user's credential proof as prover's own, using another user's credential to build the proof, building a credential proof but linking it to validity status (in blockchain) of another user's credential.

Regarding protection against identity NFT ownership theft, the various embodiments of the present invention provide a multi-factor ownership authentication as follows. (a) Identity NFT owner cryptographic private key authentication: identity NFT owner is required to sign a verifier's challenge message with the own blockchain wallet private key known only to the same. The authentication code is verifiable by the verifier using the blockchain wallet address inside the identity NFT. (b) Zero-knowledge proof (ZKP) ownership authentication: identity NFT contains two unique numeric code, known as commitments, which are cryptographically generated by two secret values known only to the identity NET owner; identity NFT owner is required to use zero-knowledge proof cryptography to create a ZKP proof using the two secret values; ZKP Proof is verifiable by counter-party by applying zero-knowledge proof cryptography to verify the proof against the two commitments.

Regarding protection against secret guessing by identity counterfeiter, the various embodiments of the present invention provide a time-limited secret in one of the secrets. The owner is required to periodically assign a different secret and the corresponding commitment value for authentication to be recognized by the verifier.

Regarding protection against replay of another user's ZKP proof by identity counterfeiter, the various embodiments of the present invention provide that each ZKP proof is built from a one-time only unique challenge code specified by the verifier. A replayed ZKP proof detected by the verifier as the proof would not match the challenge code.

Regarding protection against credential proof forgery, the various embodiments of the present invention provide that: (a) verifiable credentials must be issued by credential issuers recognized by the verifier; and (b) the verifiable credential prover is required to use the one-time-only unique code specified by the verifier to create the proof.

For (a) the verifiable credentials being issued by credential issuers recognized by the verifier, there are four possible scenarios and corresponding results. (a-i) verifiable credential proof that is inconsistent with the issued credential's content: the prover fails to generate the proof as the prover's claimed credential data content is inconsistent with the credential content signed by the credential issuer. (a-ii) verifiable credential proof built from credential that has been revoked by credential issuer: the verifier detects invalidity by verifying it against the credential validity status in the blockchain. (a-iii) verifiable credential proof built from credentials of another DID that prover owns: the verifier can verify this because the proof cannot be proven to be belonging to the DID stated in the identity NFT. (a-iv) verifiable credential proof built from credentials issued by unrecognized credential issuers: verifier detects that the proof is not built from credentials issued and signed by the verifier's specified credential issuer.

For (b) the verifiable credential prover being required to use the one-time-only unique code specified by the verifier to create the proof, there are three possible scenarios and corresponding results. (b-i) using another user's credential proof as one's own proof: each credential proof is built from a one-time only unique challenge code specified by the verifier. Hence, a replayed credential proof is detected by the verifier as the proof does not match the challenge code specified by the verifier. (b-ii) using another user's credential to build the proof: the other user's credential is cryptographically incompatible with the prover's credential wallet and master key. Thus, the prover can neither store the credential in the prover's credential wallet, nor build the proof successfully with the prover's master key. (b-iii) building a credential proof, then manually linking it to validity status (in blockchain) of another user's credential: the altered validity status linkage in the maliciously modified proof makes the proof inconsistent with the proof's cryptographic fingerprint. The verifier detects the proof to be invalid.

According to the above configuration, several positive benefits are provided by the present invention. Firstly, it emphasizes the tight coupling of multiple user identities to create a comprehensive user identity profile. This ensures a more holistic understanding of the user's identity. Additionally, the present invention enables the verification of a user's certified identity IDs and credentials, providing assurance of their authenticity. Importantly, users retain control over the scope of credentials disclosed to verifiers, enhancing privacy protection. Furthermore, the present invention offers reliable identity verification accessible to the public through a public blockchain, bolstering trust and transparency. By leveraging cryptography, the present invention effectively safeguards privacy while deterring identity forgery and theft. Moreover, real-time interaction among credential issuers, identity owners, and verifiers ensures that verification is based on the most up-to-date information. Also, the present invention allows for the attachment of identity IDs and credentials to avatars without distorting their image, offering a seamless integration of identity into virtual environments.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system for identity authentication on blockchain using non-fungible tokens (NFTs), comprising:
   a user interface, implemented by one or more processors and memory of the system, which allows a user to link a blockchain wallet and a credential wallet to the user interface and to provide an online service ID and which is configured to request the user to create a signature using a blockchain wallet private key and to create a signature using a credential wallet signing key, wherein the credential wallet of the user is non-blockchain and identified by a decentralized identifier (DID) of the user, and the blockchain wallet of the user is identified by a blockchain wallet address thereof;
   an identity NFT minting module implemented by the one or more processors and memory of the system and configured to receive information, requests, and the signatures from the user interface, wherein the identity NFT minting module is configured to verify the online service ID owned by the user and to verify the two signatures of the user using the blockchain wallet address and the DID, respectively, wherein the identity NFT minting module is further configured to mint an identity NFT on a blockchain network by an identity NFT minter when the verifying succeeds, preserving the online service ID, the blockchain wallet address, and the DID in the identity NFT as metadata; and
   a verifiable credential issuer module implemented by the one or more processors and memory of the system and configured to receive information, requests, and the signatures from the user interface, wherein the user interface enables the user to provide the DID and personal status information to the verifiable credential issuer module and request an issuance of a credential from the verifiable credential issuer module, wherein the verifiable credential issuer module is further configured to issue a verifiable credential to the user and to trigger the identity NFT minting module for adding credential metadata related to the issued verifiable credential to the identity NFT by the identity NFT minter, upon the request from the user interface to the verifiable credential issuer module having been confirmed.

2. The system according to claim 1, wherein the identity NFT minting module mints the identity NFT containing a data element that states the blockchain wallet address is the owner of the identity NFT.

3. The system according to claim 1, wherein the request from the user interface to the verifiable credential issuer module is accepted by the verifiable credential issuer module upon successfully verifying user ownership of the DID.

4. The system according to claim 3, wherein, during the verification of user ownership of the DID, the verifiable credential issuer module sends to the user a challenge message and demands the user to use a signing key of the credential wallet to sign on the challenge message, and wherein the verifiable credential issuer module is further configured to verify a signature for the challenge message using the DID.

5. The system according to claim 3, wherein the verifiable credential comprises:
   credential metadata comprising credential name and type;
   a validity status indicating whether the credential is valid or has been revoked; and
   credential data related to the provided information of the user.

6. The system according to claim 5, wherein the verifiable credential issuer module is further configured to:
   forward the credential metadata to the identity NFT minting module to be stored in the identity NFT;
   store the validity status into the blockchain network which is accessible to public accessor; and
   forward the credential data to the user to be stored into the credential wallet of the user, such that the user becomes a holder of the credential.

7. The system according to claim 1, the user interface is further configured to request the user to create two secret values and apply zero-knowledge proof (ZKP) to generate two corresponding commitment values to be stored inside the identity NFT by the identity NFT minter, and wherein the identity NFT minting module is further configured to mint the identity NFT containing the two corresponding commitment values.

8. The system according to claim 7, further comprising:
   a prover and verifier module configured to request the user via the user interface to prove knowledge of two secrets behind the corresponding commitment values in the identity NFT.

9. The system according to claim 8, wherein the prover and verifier module is further configured to:
   send a one-time only challenge code to the user via the user interface;
   request the user to use zero-knowledge proof cryptography to create a ZKP proof using the two secret values and the challenge code; and
   verify the ZKP proof by applying zero-knowledge proof cryptography to verify the ZKP proof against the two corresponding commitment values and the challenge code.

10. The system according to claim 9, wherein the prover and verifier module is further configured to:
    create a verifiable credential proof confirming the DID of the user; and
    verify real world information of the user by requesting the user to disclose credentials of the user via the user interface;
    wherein the prover and verifier module is permitted to request, via the user interface, the user to disclose full content of a subset of verifiable credentials owned by the user and to generate proof of another subset of the verifiable credentials owned by the user to prove that the verifiable credentials fulfill specific requirement;
    wherein the prover and verifier module rejects to build the verifiable credential proof when:
    it is inconsistent with content of an issued credential from the verifiable credential issuer module; or
    it is built from a credential that has been revoked by the verifiable credential issuer module; or it is built from credentials of another DID that the user owns; or it is built from credentials issued by an unrecognized credential issuer, or it is built from credentials of another user; or it is a replica of a credential proof of another individual or organization; or it is modified to link it to validity status in the blockchain network of another user's credential.

11. A method for identity authentication on blockchain using non-fungible token (NFT), comprising:

requesting a user, by a user interface implemented by one or more processors and memory of a computer system, to link a blockchain wallet and a credential wallet to the user interface and to provide an online service ID;

requesting the user, by the user interface, to create a signature using a blockchain wallet private key and to create a signature using a credential wallet signing key, wherein the credential wallet of the user is non-blockchain and identified by a decentralized identifier (DID) of the user, and the blockchain wallet of the user is identified by a blockchain wallet address thereof;

receiving information, requests, and the signatures from the user interface by an identity NFT minting module;

verifying, by the identity NFT minting module, the online service ID owned by the user;

verifying, by the identity NFT minting module, the two signatures of the user using the blockchain wallet address and the DID, respectively; and minting an identity NFT, by the identity NFT minting module, on a blockchain network via an identity NFT minter, when the verifying succeeds, preserving the online service ID, the blockchain wallet address, and the DID in the identity NFT as metadata;

receiving, by a verifiable credential issuer module, the DID and personal status information of the user and a request for an issuance of a credential via the user interface from the user;

issuing, by the verifiable credential issuer module, a verifiable credential to the user; and triggering, by the verifiable credential issuer module, the identity NFT minting module for adding credential metadata related to the issued verifiable credential to the identity NFT via the identity NFT minter, upon the request from the user interface to the verifiable credential issuer module having been confirmed.

12. The method according to claim 11, wherein the identity NFT minting module mints the identity NFT containing a data element that states the blockchain wallet address is the owner of the identity NFT.

13. The method according to claim 11, wherein the request from the user interface to the verifiable credential issuer module is accepted by the verifiable credential issuer module upon successfully verifying user ownership of the DID.

14. The method according to claim 13, wherein, during the verification of user ownership of the DID, the verifiable credential issuer module sends to the user a challenge message and demands the user to use a signing key of the credential wallet to sign on the challenge message, and wherein the verifiable credential issuer module is further configured to verify a signature for the challenge message using the DID.

15. The method according to claim 13, wherein the verifiable credential comprises:

credential metadata comprising credential name and type;

a validity status indicating whether the credential is valid or has been revoked; and credential data related to the provided information of the user.

16. The method according to claim 15, further comprising:

forwarding, by the verifiable credential issuer module, the credential metadata to the identity NFT minting module to be stored in the identity NFT;

storing, by the verifiable credential issuer module, the validity status into the blockchain network which is accessible to public accessor; and forwarding, by the verifiable credential issuer module, the credential data to the user to be stored into the credential wallet of the user, such that the user becomes a holder of the credential.

17. The method according to claim 11, further comprising:

requesting, by the user interface, the user to create two secret values and apply zero-knowledge proof (ZKP) to generate two corresponding commitment values to be stored inside the identity NFT by the identity NFT minter, wherein the identity NFT minting module mints the identity NFT containing the two corresponding commitment values.

18. The method according to claim 17, further comprising:

requesting, by a prover and verifier module, to the user via the user interface to prove knowledge of two secrets behind the corresponding commitment values in the identity NFT.

19. The method according to claim 18, further comprising:

sending, by the prover and verifier module, a one-time only challenge code to the user via the user interface;

requesting, by the verifier module, the user to use zero-knowledge proof cryptography to create a ZKP proof using the two secret values and the challenge code; and verifying, by the verifier module, the ZKP proof by applying zero-knowledge proof cryptography to verify the ZKP proof against the two corresponding commitment values and the challenge code.

20. The method according to claim 19, further comprising:

creating, by the prover and verifier module, a verifiable credential proof confirming the DID of the user; and verifying, by the prover and verifier module, real world information of the user by requesting the user to disclose credentials of the user via the user interface;

wherein the prover and verifier module is permitted to request, via the user interface, the user to disclose full content of a subset of verifiable credentials owned by the user and to generate proof of another subset of the verifiable credentials owned by the user to prove that the verifiable credentials fulfill specific requirement;

wherein the prover and verifier module rejects to build the verifiable credential proof when:

it is inconsistent with content of an issued credential from the verifiable credential issuer module; or it is built from a credential that has been revoked by the verifiable credential issuer module; or it is built from credentials of another DID that the user owns; or it is built from credentials issued by an unrecognized credential issuer, or it is built from credentials of another user; or it is a replica of a credential proof of another individual organization; or it is modified to link it to validity status in the blockchain network of another user's credential.

* * * * *